(12) United States Patent
Sakurai et al.

(10) Patent No.: US 6,345,030 B1
(45) Date of Patent: Feb. 5, 2002

(54) DISK APPARATUS

(75) Inventors: Toshihiro Sakurai; Takashi Nakashima, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/199,946

(22) Filed: Nov. 25, 1998

(30) Foreign Application Priority Data

Nov. 28, 1997 (JP) .............................................. 9-327631

(51) Int. Cl.⁷ .............................................. G11B 17/04
(52) U.S. Cl. ...................... 369/192; 369/75.2; 369/77.1
(58) Field of Search ................................ 369/192, 77.1, 369/75.2, 36, 37, 34, 178, 191, 193, 194, 77.2

(56) References Cited

U.S. PATENT DOCUMENTS

| | | | | |
|---|---|---|---|---|
| 5,022,023 A | | 6/1991 | Toyoguchi | 369/77.1 |
| 5,119,354 A | * | 6/1992 | Umesaki | 369/36 |
| 5,327,412 A | | 7/1994 | Lee | 369/75.2 |
| 5,544,148 A | * | 8/1996 | Nakamichi | 369/192 |
| 5,583,839 A | | 12/1996 | Choi | 369/75.2 |
| 5,852,597 A | * | 12/1998 | Fujisawa et al. | 369/192 |
| 5,881,045 A | * | 3/1999 | Inoue | 369/192 |
| 5,896,981 A | * | 11/1999 | Takemasa et al. | 369/37 |
| 6,052,356 A | * | 4/2000 | Fujimoto et al. | 369/192 |
| 6,058,097 A | * | 5/2000 | Inoue | 369/192 |
| 6,185,164 B1 | * | 2/2001 | Takemasa et al. | 369/34 |

FOREIGN PATENT DOCUMENTS

JP 06111443 4/1994

* cited by examiner

Primary Examiner—Hoa T. Nguyen
Assistant Examiner—Angel Castro
(74) Attorney, Agent, or Firm—Brinks Hofer Gilson & Lione

(57) ABSTRACT

When a second disc is inserted, recording and/or reproducing operation of information on or from a first disc is stopped, and a moving member is moved in the X1-direction. This movement allows a clamp chassis to be moved upward and unclamped, and the second disc is carried into a disc apparatus by a transfer roller and is supported by disc guides. Then, the first and the second discs are supported by the disc guides and are moved upward and then, the first disc is carried out of an insertion opening by the transfer roller. In the course of the movement of the drive chassis to the upper position, the second disc is placed on a turntable, and is chucked and clamped by a clamper. Therefore, it is possible to exchange the second disc with the first disc only by inserting the second disc.

5 Claims, 6 Drawing Sheets

DISK APPARATUS

BACKGROUND OF THE INVENTION

1. Field of the Invention

The present invention relates to a disc apparatus for recording and/or reproducing information on and/or from a recording medium, such as a CD (compact disc) or a DVD (digital versatile disc), and more particularly, to a disc apparatus in which may be inserted therein a second disc, and which can drive both the first and second discs.

2. Description of the Related Art

Hitherto, there have been disc apparatuses of various types for inserting thereinto a recording medium, for example, of the so-called "tray loading type", "leaf-actuation loading type", "slot-in loading type", etc.

The disc apparatus of the "tray loading type" has been used most frequently. In this type of disc apparatus, a tray movably provided on a front panel or the like of the disc apparatus is extended out by pressing an operating button, a disc is loaded on the tray, and the tray is retracted into the disc apparatus. The disc is carried in and out of the disc apparatus by means of the tray.

The disc apparatus of the "leaf-actuation loading type" is frequently used particularly for portable disc players, and this apparatus, in which a leaf opens and a disc is placed directly on the turntable is most common. When the leaf is closed, the disc is clamped between a clamping member provided on the leaf and the turntable.

In the disc apparatus of the "leaf-actuation loading type" used for a vertical disc apparatus, a disc is loaded inside a rotatably supported leaf, and the disc is placed inside the disc apparatus by closing the leaf.

In addition, the disc apparatus of the "slot-in loading type" is used for the disc apparatus for inserting thereinto a recording medium stored in a cartridge, such as an MD (Mini Disc), an MO (Magneto Optical disc) and a PD (Power Disc). In this type of disc apparatus, the recording medium is inserted into the apparatus from an insertion opening provided in a front panel.

In these types of the disc apparatuses, however, except in the "disc changer type" disc apparatus for holding a second disc in advance, a second disc must be inserted after once removing the first disc having information recorded thereon and/or reproduced therefrom, so that the discs cannot be easily exchanged.

In addition, even in the "disc changer type" disc apparatus, the discs must be stored in a magazine and the like in advance, so that information on the disc that is not stored in the magazine cannot be recorded and/or reproduced. Therefore, such a disc must be reset in the magazine, and very complicated operations are required.

Furthermore, in a disc apparatus installed in a vehicle, the exchange of discs is difficult during vehicle operation, and entails some risk.

SUMMARY OF THE INVENTION

It is an object of the present invention to provide a disc apparatus in which a second disc can be inserted, with a first disc on which information has been previously recorded and/or reproduced therefrom still present in the disc apparatus, and which then exchanges the first and the second discs in the disc apparatus to eject the first disc.

In accordance with the present invention, there is provided a disc apparatus, including: an insertion opening for inserting thereinto a disc; a transfer means for transferring the inserted disc to an inner part of the apparatus; a support means for temporarily supporting the inserted disc and a disc remaining in the disk apparatus; a disk driving means for holding a disc to perform at least one of recording and reproducing; and a moving means for moving at least one of the support means and the disc driving means in a direction perpendicular to the surface of the disc, wherein, of the discs supported by the disc driving means, one disc remaining in the disc apparatus is held by the disc driving means to perform at least one of recording and reproducing operation of the disc.

In addition, in the disc apparatus of the present invention, when another disc is inserted from the insertion opening, a space area of the support means may oppose the insertion opening, and the disc transferred by the transfer means may be supported by the space area.

Furthermore, in the disc apparatus of the present invention, the another disc inserted via the insertion opening is moved by the movement of the support means after being supported by the space area, and the disc already supported by the support means being moved by the transfer means to a position where the disc can be removed from the insertion opening.

Still furthermore, in the disc apparatus of the present invention, a pressure means which presses a disc toward the transfer means at the inner part of the apparatus may preferably oppose the another disc opposed to the insertion opening by the movement of the support means.

In addition, the disc apparatus of the present invention may have a construction such that after the disc has been removed from the insertion opening, the support means stops, and the disc driving means moves to the position of the another disc supported by the support means to hold the another disc.

Furthermore, in the disc apparatus of the present invention, the support means and the disc driving means may preferably be moved by the same moving member.

In the disc apparatus of the present invention, it is possible to perform recording and/or reproducing operation of information on or from a disc at two positions of the upper position and the lower position. The setting of the upper position or the lower position is determined by a state of devices of the disc apparatus in which a power of the disc apparatus is turned off at the completion of previous use thereof. In the initial state in which the power is turned on again and the disc is not inserted in the disc apparatus, the recording and/or reproducing information of the disc may be performed at either the upper position or the lower position.

In addition, if a first disc is inserted into the disc apparatus when the initial state is set to the upper position, the devices move to the lower position upon insertion of the first disc to perform recording and/or reproducing operation, while the devices move to the upper position to perform recording and/or reproducing operation when the initial state is set to the lower position. In addition, if a second disc is inserted into the insertion opening during recording and/or reproducing information on or from the first disc, the devices start to move to the upper position or the lower position upon insertion of the second disc. Therefore, even if the presence of the first disc in the disc apparatus is unknown, the insertion of the second disc is accepted, so that the discs can be easily changed.

In addition, at least one of the support means, the clamping means and the disc driving means may preferably be moved between the upper position and the lower position upon insertion of the second disc.

In the disc apparatus of the present invention, when exchanging the discs, the disc driving means may be fixed and the support means may be moved up and down, the clamping means having a clamper may be fixed and both the support means and the disc driving means may be moved up and down, or the support means may be fixed and the clamping means and the disc driving means may be moved up and down.

In addition, the disc apparatus may be of the "self-clamping type" in which the clamping means having the clamper is not provided, and only a turntable provided on the disc driving means holds the disc.

According to the disc apparatus of the present invention, the second disc can be loaded in the disc apparatus only by being inserted into the insertion opening, and moreover, the second disc can be inserted into the insertion opening with the first disc still loaded in the disc apparatus. Therefore, unlike the conventional disc apparatus, the discs can be easily exchanged since the action of pressing an eject button to remove the first disc is not required.

DESCRIPTION OF THE PREFERRED EMBODIMENTS

Figure 1:
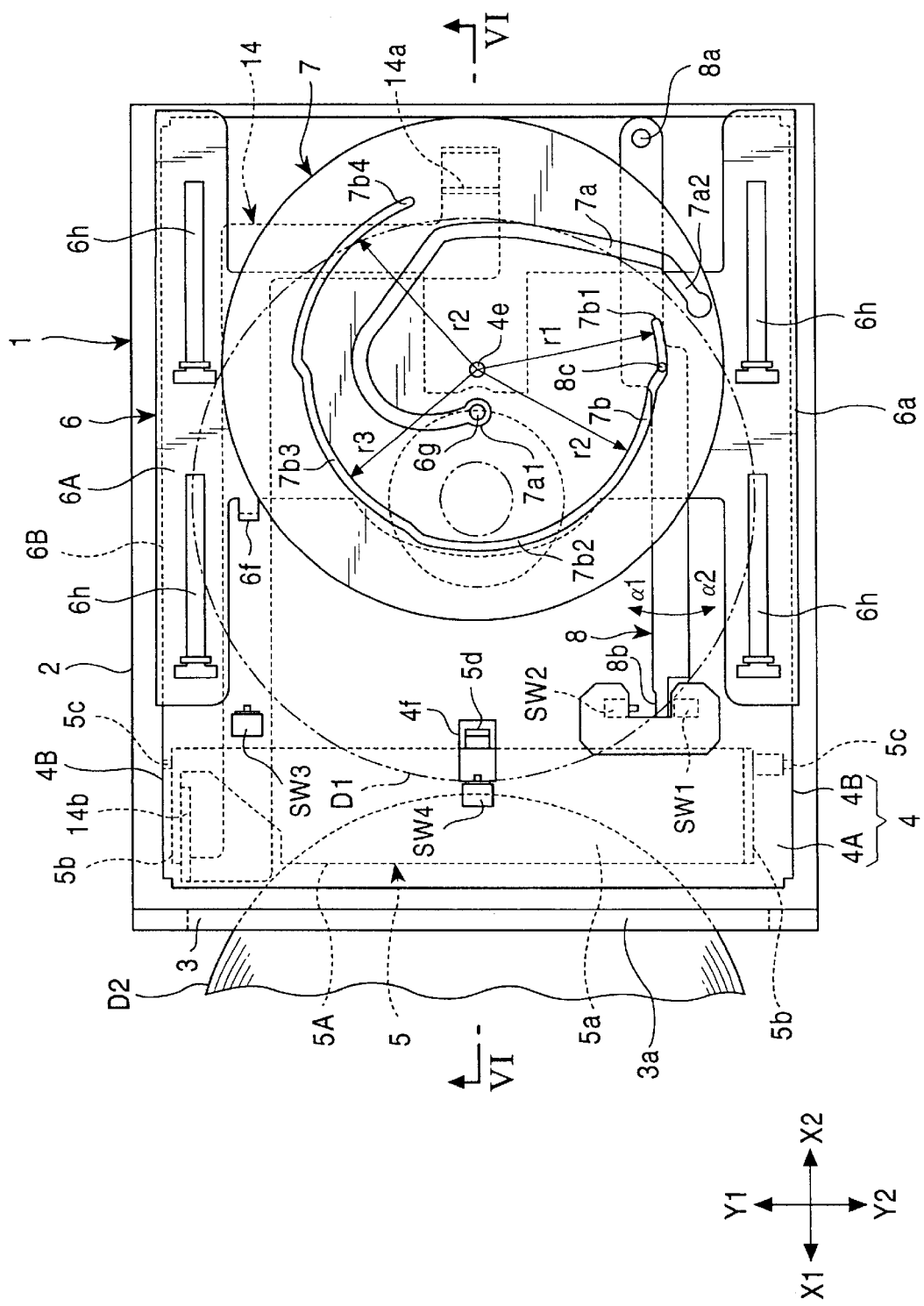
FIG. 1 is a plan view showing an embodiment of a disc apparatus according to the present invention.

A disc apparatus 1 shown in FIG. 1 includes an outer casing 2, and an insertion opening 3a is formed in a cosmetic panel (front panel) 3 provided on the left end (in the X1 direction) of the outer casing 2. That is, the disc apparatus 1 is of the so-called "slot-in loading type" for loading and unloading a disc (recording medium) through the insertion opening 3a.

Figure 2:
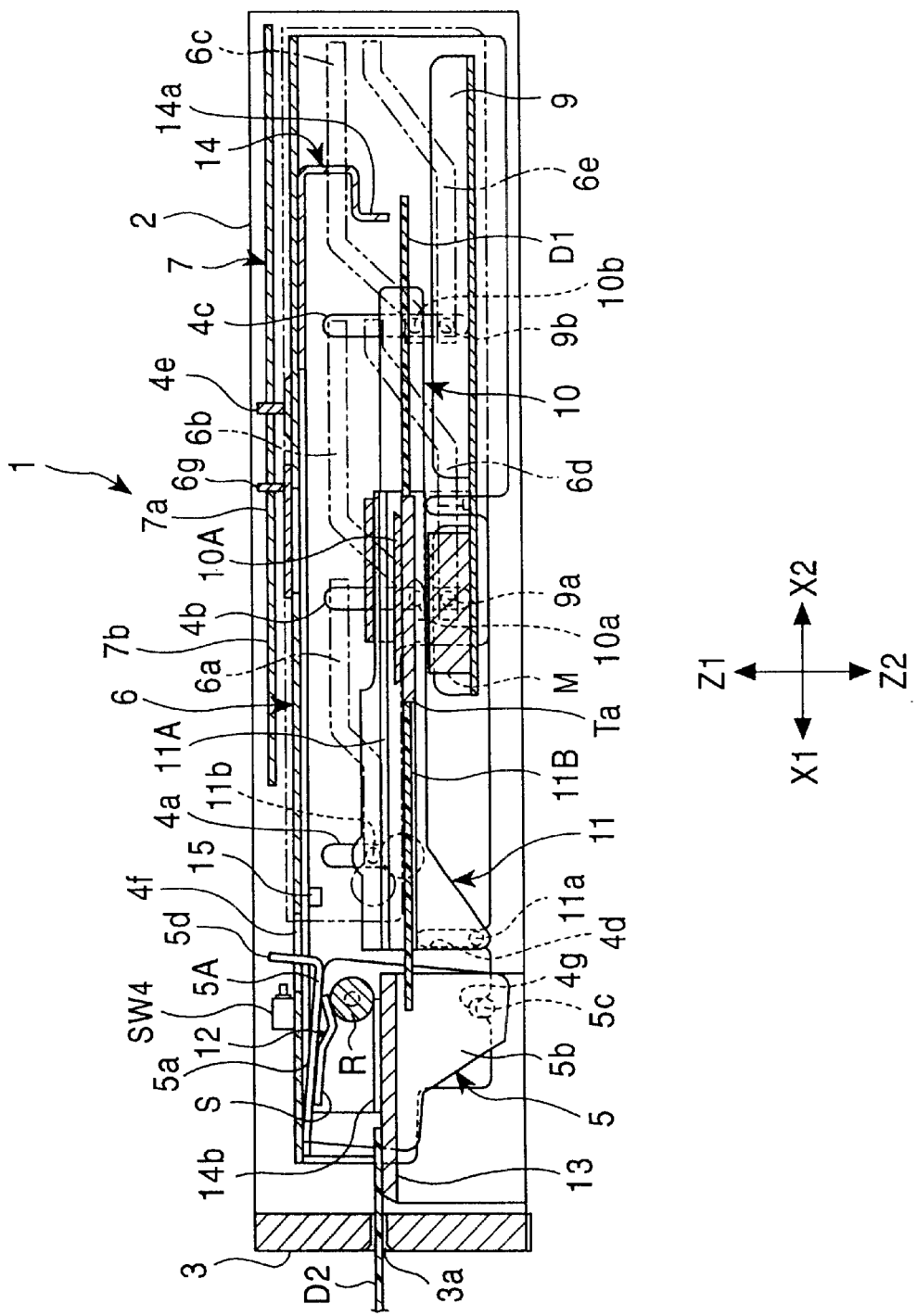
FIG. 2 is a side view of FIG. 1.
Figure 3:
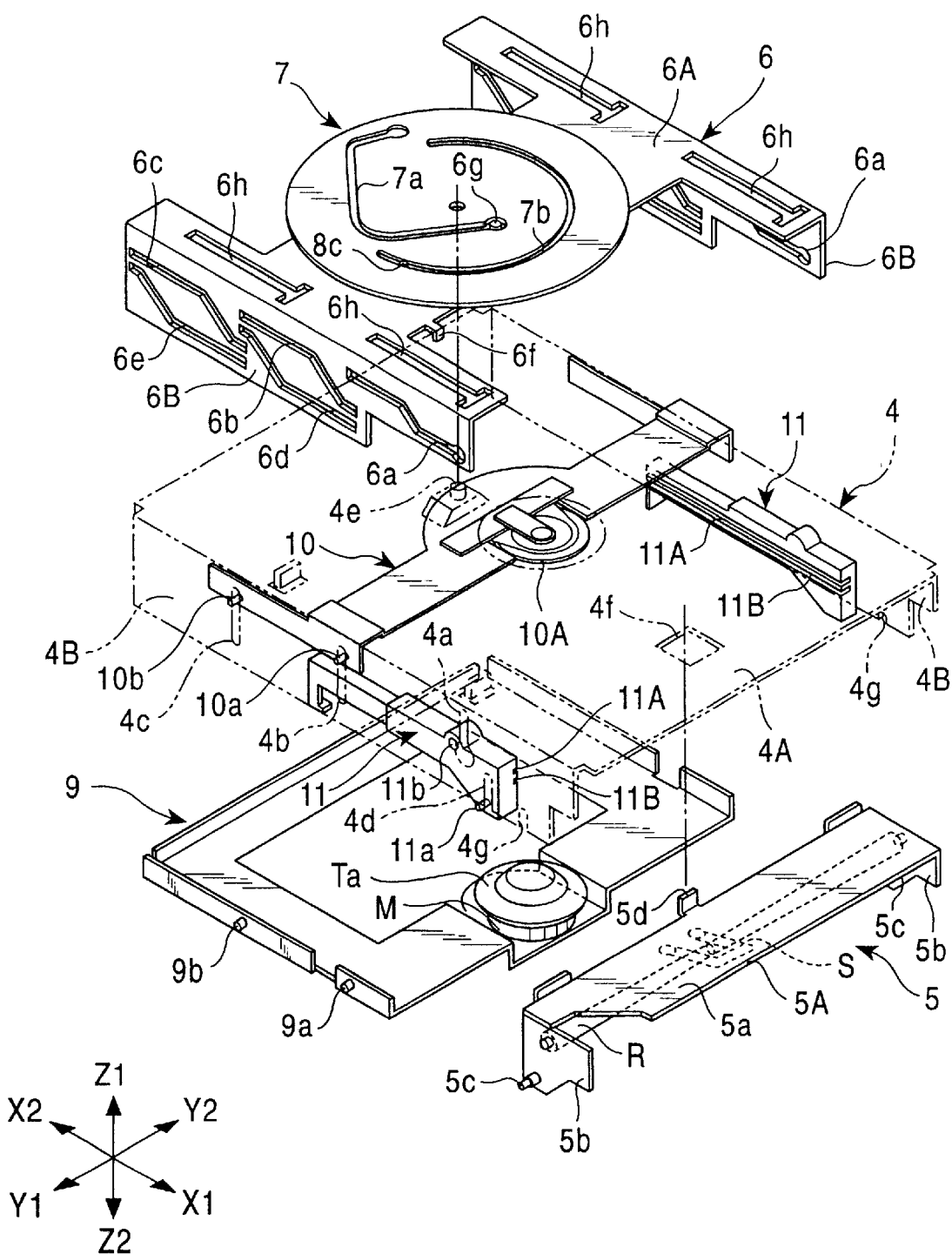
FIG. 3 is a perspective view showing main components of the disc apparatus shown in FIGS. 1 and 2.

As shown in FIGS. 1 to 3, an inner casing 4 is provided inside the outer casing 2. The inner casing 4 consists of a top plate 4A and side plates 4B and 4B formed by bending a metal plate. A plurality of guide slots 4a, 4b, and 4c, and U-shaped slots 4d shown by dotted lines in FIG. 2 are formed in the side plates 4B in the Z-direction, and a rotation shaft 4e is provided on the top plate 4A. A transfer device 5 is provided on the X1 side (behind the disc insertion opening 3a) in the inner casing 4, and a moving member 6 is provided on the peripheral surface of the inner casing 4.

The transfer device 5 comprises, for example, a metal plate, and consists of a substantially U-shaped transfer chassis 5A, a transfer roller R rotatably supported inside the transfer chassis 5A and a transfer motor (not shown) for rotating the transfer roller R clockwise or counterclockwise. A biasing member S formed by a plate spring or the like is provided on the lower surface of a top surface 5a of the transfer chassis 5A to bias the transfer roller R in the Z2 direction. Rotation shafts 5c and 5c projecting in the direction of the Y axis are provided on the side plates 5b and 5b of the transfer chassis 5A, respectively, and are rotatably supported by recesses 4g formed in the inner casing 4.

The moving member 6 is formed by bending a metal plate in substantially an H-shape, and is slidable on the surface of the inner casing 4 in the X-direction along four guide slots 6h that are formed in a top plate 6A thereof. A plurality of guide slots 6a, 6b, 6c, 6d, and 6e are symmetrically provided on both side plates 6B of the moving member 6, respectively.

A disc-like large gear 7 is rotatably supported by the rotation shaft 4e on the top plate 6A (on the Z1 side). The large gear 7 is connected to a driving motor (not shown) provided in the disc apparatus 1 directly or through gears so as to be rotated clockwise or counterclockwise. A first cam slot 7a and a second cam slot 7b are formed in the large gear 7, and a sliding pin 6g implanted in the top plate 6A of the moving member 6 is penetrated through the first cam clot 7a. Therefore, when the large gear 7 is rotated clockwise or counterclockwise, the sliding pin 6g moves along the first cam slot 7a, whereby the moving member 6 is moved in the X-direction.

As shown in FIG. 1, a rotary lever 8 is provided on the top plate 4A of the inner casing 4, and is rotatably supported by a spindle 8a provided on the side of the X2. A pressure portion 8b is formed on the opposite end side (the X1 side) of the spindle 8a so that a first switch SW1 opposes a second switch SW2. A sliding pin 8c is provided between the spindle 8a and the pressure portion 8b, and is penetrated through a second cam slot 7b.

The second cam slot 7b is formed by connecting four cam slots 7b1, 7b2, 7b3, and 7b4, each have a predetermined angle divided by different distances (radiuses) from the rotation shaft 4e. In other words, the counterclockwise end cam slot 7b1 is formed by the longest radius r1, the cam slot 7b2 following the cam slot 7b1 is formed by the second longest radius r2, and the cam slot 7b3 has a radius 3 shorter than that of the cam slot 7b2. The clockwise end cam slot 7b4 is set to have substantially the same radius as the radius r2 (r1>r2>r3). Therefore, when the large gear 7 is rotated, and the sliding pin 8c moves along the cam slot 7b, the rotary lever 8 is rotated in a direction of α1 or α2 in accordance with the difference in the radius of the cam slots 7b1 to 7b4. The rotation of the rotary lever 8 allows the first switch SW1 or the second switch SW2 to be in the ON or OFF position.

A part of the top plate 6A of the moving member 6 is bent to form a pressure portion 6f, and the pressure portion 6f opposes a third switch SW3 provided on the top plate 4A of the inner casing 4. When the moving member 6 is moved as far as possible in the X1-direction, the pressure portion 6f presses the third switch SW3 to be in the ON position.

In addition, a part of the top plate 5a of the transfer chassis 5A is bent to form a projection 5d, and the projection 5d is exposed in the Z1-direction from a square hole 4f (see FIG. 1) formed in the inner casing 4 to oppose a fourth switch SW4 that is provided on the edge of the square hole 4f on the X1 side.

As shown in FIGS. 1 and 2, a pressure lever 14 is provided on the lower surface of the top plate 4A of the inner casing 4. The pressure lever 14 is formed by bending a metal plate in substantially an L-shape, and has a pressure portion 14a formed at the end thereof on the X2 side that is pressed by the end of a disc D. The height of the pressure portion 14a is set to substantially the same height as that of the insertion opening 3a. The other end (X1 side) of the pressure lever 14 is bent on the Y1 side along the side plate 5b of the transfer chassis 5A. Furthermore, a part of the pressure lever 14 is bent below the transfer roller R to form a running portion 14b. Since the biasing member S biases the transfer roller R in the Z2-direction, the transfer roller R is elastically pressed towards the running portion 14b. Therefore, when the transfer roller R is rotated, a feeding force thereof acts on the running portion 14b, so that the pressure lever 14 moves in the X-direction in accordance with the direction of rotation of the transfer roller R.

As shown in FIGS. 2 and 3, a drive chassis 9 for driving a disc driving, and a clamp chassis 10 for clamping the disc are provided inside the inner casing 4. The drive chassis 9 is provided with a spindle motor M, and a turntable Ta is supported by the rotation axis thereof. The clamp chassis 10 is provided with a clamper 10A that opposes the turntable Ta. Moving pins 9a and 9b, and 10a and 10b, are implanted in the side plates of the drive chassis 9 and the clamp chassis 10, respectively. The moving pins 9a and 9b are penetrated through the guide slots 4b and 4c, and the guide slots 6d and 6e so as to be movable therein. Similarly, the moving pins 10a and 10b are penetrated through the guide slots 4b and 4c, and 6b and 6c, so as to be movable therein.

A pair of disc guides 11 and 11 for temporarily supporting the disc are provided on the side plates 4B and 4A, respectively. The disc guides 11 are formed by, for example, injecting a resin material, and upper ribs 11A and lower ribs 11B each extending in the X-direction are formed on the opposing surfaces of the disc guides 11 and 11. Moving pins 11a and 11b are pressed into the lower parts on the X1 side of the disc guides 11, and parts on the Z2 side of the disc guides 11 projecting in the form of a semicircle, respectively. The moving pins 11a are inserted into the U-shaped slots 4d, and the moving pins 11b are inserted into the guide slots 4a and the guide slots 6a, respectively, so that the disc guides 11 can move up and down in the Z-direction.

In addition, the drive chassis 9 is provided with a disc recording and/or reproducing device (not shown), and a pickup opposes a recording surface of the disc D so as to move in the direction of the rotation shaft of the turntable Ta. Information can be recorded or reproduced on a recording surface of the disc D by an optical head, a magnetic head, or the like, mounted on the turntable Ta.

The operation of the disc apparatus constructed as described above will now be described.

FIG. 2 shows that the moving member 6 has moved as far as possible in the X2-direction, and the drive chassis 9, the clamp chassis 10, and the disc guides 11 have all moved downward in the Z2-direction. In addition, a first disc D1 is in a state clamped between the turntable Ta and the clamper 10A, and the first disc D1 is rotated to effect recording and/or reproducing. In the clamped state, the first switch SW1 is in the ON position, and all the second to fourth switches SW2 to SW3 are in the OFF position (see FIG. 1).

Figure 4:
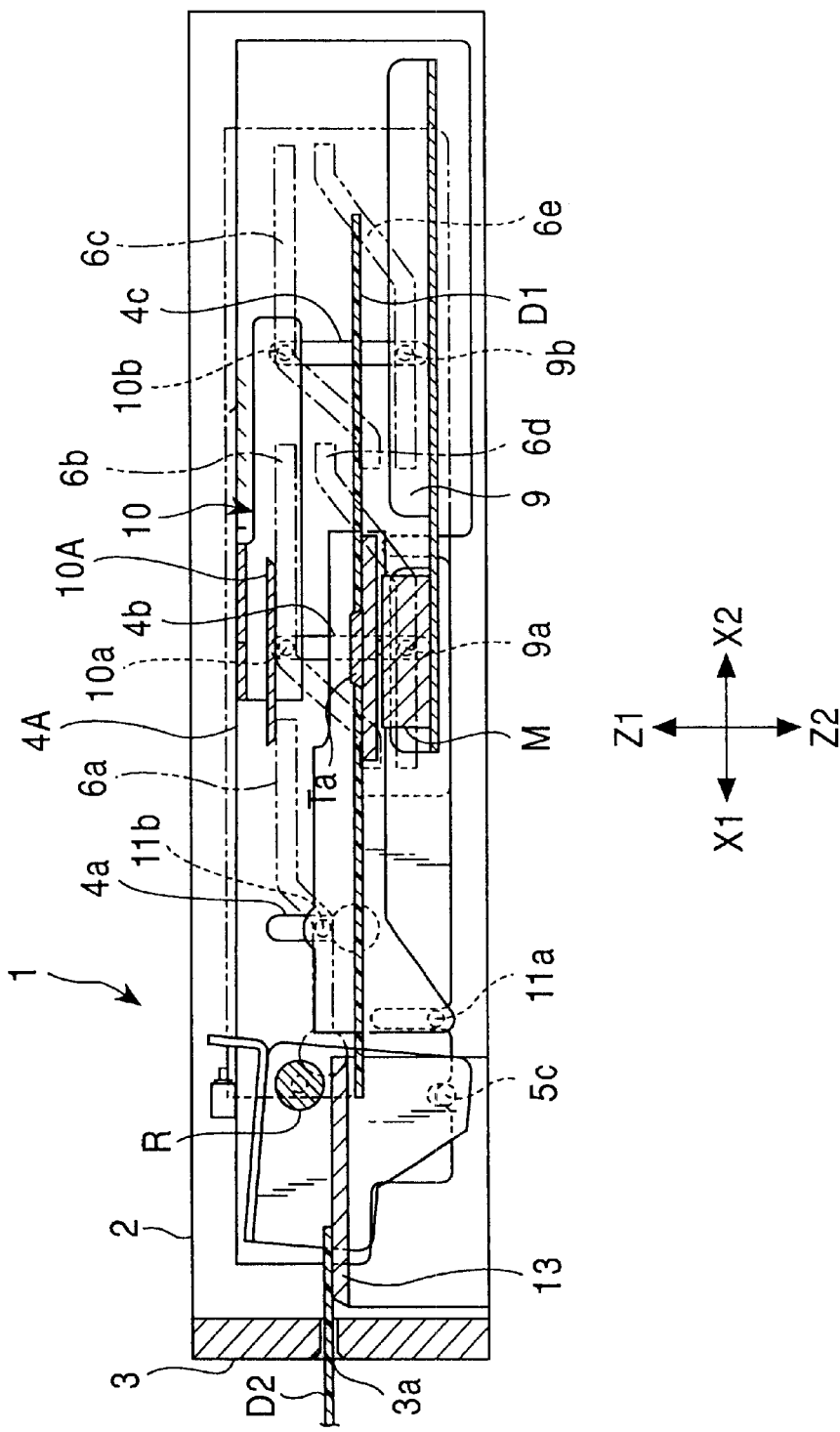
FIG. 4 is a cross-sectional view taken along the line IV—IV of FIG. 1 showing the upward movement of a clamp chassis.

In the above clamped state, when a second disc D2 is inserted into the insertion opening 3a, the insertion is detected by a detection device 12 provided on the transfer device 5, and the spindle motor M is stopped. Simultaneously, a driving motor (not shown) is actuated, whereby the large gear 7 is rotated counterclockwise (see FIG. 1), and the moving member 6 is moved in the X1-direction. As shown in FIG. 4, when the moving member 6 is moved in the X1-direction, the moving pins 10a and 10b of the clamp chassis 10 climb along inclined portions of the guide slots 4b and 4c, and 6b and 6c, so that the clamp chassis 10 is moved upward in the Z1-direction. That is, the clamp chassis 10 is separated from the drive chassis 9, and the first disc D1 is unclamped.

When the clamp chassis 10 starts to move upward, the first switch SW1 is changed to the OFF position, in accordance with the rotation of the rotary lever 8 to a neutral position. When the clamp chassis 10 reaches the upper side of the inclined portions of the guide slots 6b and 6c, the rotary lever 8 is rotated in the α1 direction, so that the second switch is in the ON position. That is, when the large gear 7 is rotated by a predetermined angle and the moving pins 9a and 9b are positioned on the lower side of the inclined portions of the guide slots 6b and 6c, the sliding pin 8c moves to the part 7b2 (radius r2) of the second cam slot 7b, whereby the rotary lever 8 is slightly rotated in the a1 direction, and the pressure portion 8b separates from the first switch SW1 to allow the first switch SW1 to be in the OFF position. When the large gear 7 is further rotated and the moving pins 9a and 9b reach the upper side of the inclined portions, the sliding pin 8c on the large gear 7 moves from the slot 7b2 to the slot 7b3 of the second cam slot 7b. This allows the rotary lever 8 to be rotated further in the α1 direction, and the second switch SW2 is pressed and changed from the OFF position to the ON position. In other words, the rotary lever 8 is gradually rotated by the second cam slot 7b in accordance with the upward movement of the clamp chassis 10.

When the change of the second switch SW2 to the ON position is detected, the transfer motor is actuated, and the transfer roller R is rotated counterclockwise (see FIG. 2) which is the direction in which the second disc D2 is transferred into the disc apparatus 1. The second disc D2 is inserted by an intentional force using a support base 13 provided between the insertion opening 3a and the transfer roller R as a guide with a horizontal position thereof maintained. An end of the second disc D2 on the X2 side enters into the lower side of the transfer roller R, whereby the second disc D2 is clamped between the transfer roller R and the support base 13, and is transferred by a feeding force of the transfer roller R to the inner portion (the X2 side) of the disc apparatus 1. In this case, the second disc D2 is transferred by being guided on the upper ribs 11A, and is temporarily supported there after the completion of transference.

Figure 5:
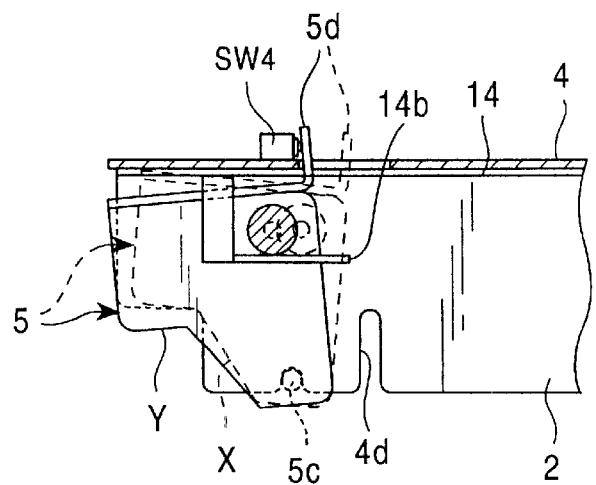
FIG. 5 is a cross-sectional view similar to FIG. 4 showing the rotation of a transfer device.

When the transfer roller R is rotated counterclockwise, the feeding force of the transfer roller 5 also acts on the running portion 14b of the pressure lever 14, so that the pressure lever 14 is fed in the X2-direction. On the other hand, since the transfer chassis 5A is rotatably supported by the rotation shafts 5c and 5c, the transfer chassis 5A moves relatively on the running portion 14b in the X1-direction. Therefore, the transfer device 5 is rotated counterclockwise around the rotation shafts 5c and 5c, and its position changes from the initial position X, shown by dotted lines, to the position Y inclined toward the cosmetic panel 3 (the X1 side), shown by solid lines in FIG. 5. In this case, the projection 5d presses the fourth switch SW4, so that the fourth switch SW4 is changed from the OFF position to the ON position.

Figure 6:
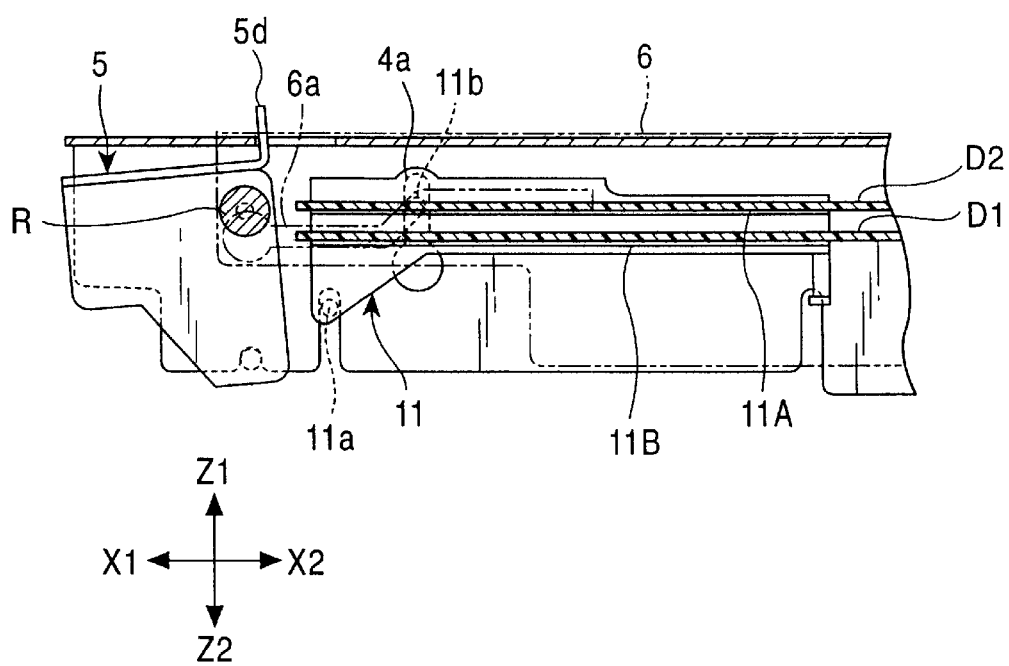
FIG. 6 is a cross-sectional view similar to FIG. 4 showing the upward movement of disc guides.

When the OFF position of the fourth switch SW4 is checked, the large gear 7 is rotated again and the moving member 6 is further moved in the X1-direction. In this case, the moving pins 11b inserted into the guide slots 4a and 6a climb the inclined portions of the guide slots 6a, as shown in FIG. 6, whereby the disc guide 11 is moved upward in the Z1-direction. At this time, the second disc D2 is supported by the upper ribs 11A and the first disc D1 is supported by the lower ribs 11B, and both the first and second discs D1 and D2 move upward in the Z1-direction. When the moving pins 11b reach the upper horizontal portions of the guide slots 6a, the first disc D1 stops at the same height as that of the insertion opening 3a. In this case, the edge of the first disc D1 on the X2 side opposes the pressure portion 14a of the pressure lever 14. The moving member 6 is further moved in the X1-direction, and the moving pins 11b move on the upper horizontal portions of the guide slots 6a in the X2-direction, whereby the height of the disc guide 11 is determined. In this case, the sliding pin 8c moves from the slot 7b3 to the slot 7b4, and the second switch SW2 is changed to the OFF position.

When an OFF signal of the second switch SW2 is detected, the transfer roller R is rotated clockwise. When the transfer roller R is rotated clockwise, the operations described above are performed in reverse order. That is, the transfer device 5 is rotated clockwise to return from the inclined position Y, shown by solid lines, to the initial position X, shown by dotted lines in FIG. 5. On the other hand, a feeding force in the X1-direction is imparted to the running portion 14b by the rotating force of the transfer roller R, so that the entire pressure lever 14 moves in the X1-direction opposite to the direction of movement of the transfer device 5. Therefore, the pressure portion 14a presses the end of the first disc D1 on the X2 side, and the first disc D1 is pushed out in the X1-direction. In this case, the end of the first disc D1 on the X1 side is clamped between the lower part of the transfer roller R and the support base 13 in accordance with the return of the transfer device 5 to the initial position X. Then, the clockwise feeding force of the transfer roller R is supplied to the first disc D1, and the first disc D1 is finally ejected from the insertion opening 3a.

The completion of ejection of the first disc D1 can be detected by a detection device 15, such as an optical sensor, and the above detection device 12, or the like (see FIG. 2). That is, the rotation of the transfer roller R is stopped before the end of the first disc D1 on the X1 side passes through the detection device 15 and the detection device 12. This allows the end of the first disc D1 on the X1 side to stop in a state sandwiched between the transfer roller R and the support base 13, so that it is possible to prevent dropping of the first disc D1 at the time of the ejection. In addition, it is possible to easily remove the first disc D1 by exerting a slight pulling force on the first disc D1 in the X1-direction.

Figure 7:
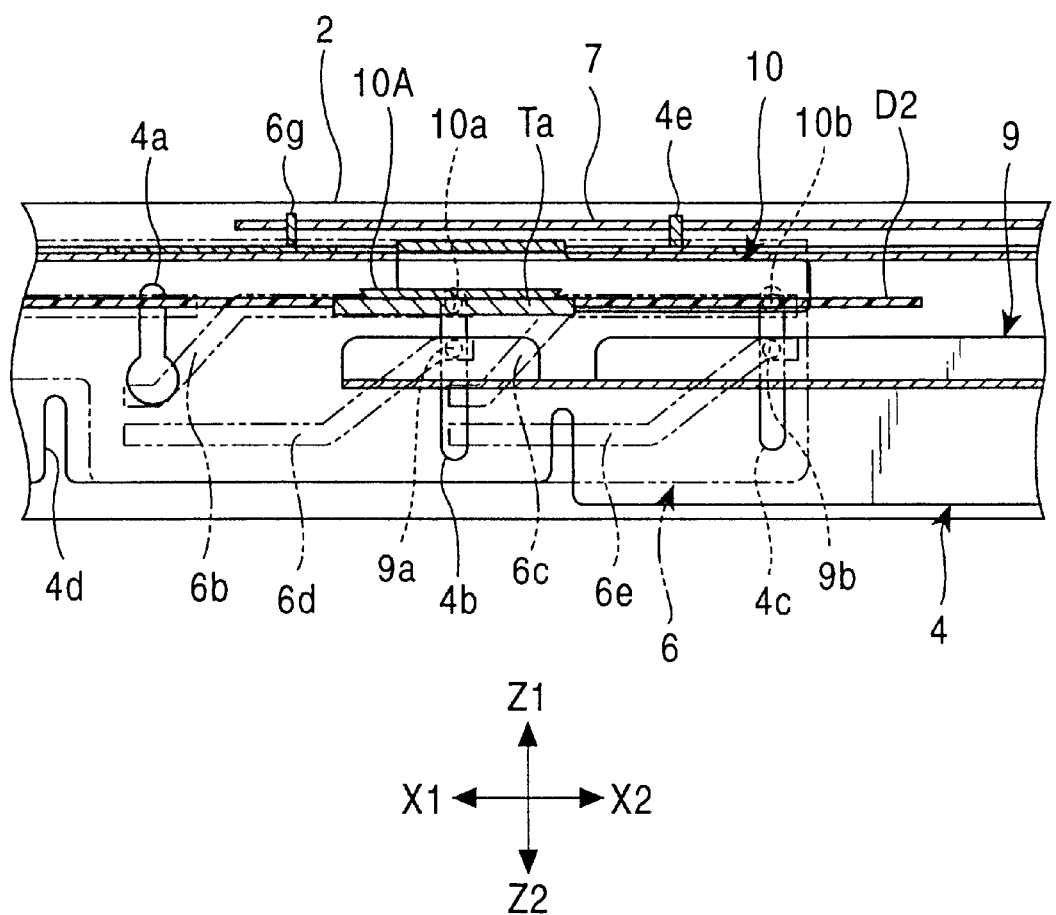
FIG. 7 is a cross-sectional view similar to FIG. 4 showing an upper position.

When the completion of ejection of the first disc D1 is detected by the detection device 15, the large gear 7 is rotated again, and the moving member 6 is further moved in the X1-direction. The sliding pin 6g reaches the end 7a2 of the first cam slot 7a. The process of movement of the drive chassis 9 is as follows. The moving pins 9a and 9b of the drive chassis 9 climb the guide slots 4b and 4c, and the inclined portions of the guide slots 6d and 6e to move upward, and the drive chassis 9 reaches the upper horizontal portions of the inclined portions. The second disc D2, supported by the upper ribs 11A, is placed on the turntable Ta during the upward movement of the drive chassis 9. The turntable Ta is chucked by the clamper 10A when the drive chassis 9 reaches the upper side of the inclined portions, so that the second disc D2 is clamped between the turntable Ta and the clamper 10A. In this clamped state, since the moving member 6 is moved as far as possible in the X1-direction, the pressure portion 6f presses the third switch SW3 to change the switch SW3 from the OFF position to the ON position. When an ON signal Is detected, information on the second disc D2 is recorded and/or reproduced at the upper position by the disc recording and/or reproducing device (not shown) provided on the drive chassis 9, as shown in FIG. 7.

A case will now be briefly described in which a third disc D3 (not shown) is inserted into the insertion opening 3a when the information on the second disc D2 is being recorded and/or reproduced at the upper position.

During recording and/or reproducing the information on and/or from the second disc D2 at the upper position, the large gear 7 is rotated counterclockwise as far as possible, and the sliding pin 6g is positioned at the end 7a2 of the first cam slot 7a.

When the third disc D3 is inserted into the insertion opening 3a, the insertion is detected by the detection device 12 in a manner similar to that above, and the disc recording and/or reproducing device is stopped. Then, the large gear 7 is rotated clockwise and the moving member 6 is moved in the X2-direction. Therefore, the drive chassis 9 moves downward along the guide slots 6d and 6e, whereby the clamper 10A is separated from the turntable Ta, and the second disc D2 is unclamped. The second disc D2 is supported by the upper ribs 11A of the disc guides 11 during the downward movement of the drive chassis 9, so that only the drive chassis 9 moves downward to the lower position.

In this state, the third disc D3 is carried into the disc apparatus 1 in the same manner as described above. Since, however, the disc guides 11 are positioned upward, the third disc D3 is supported by the lower ribs 11B. When the moving member 6 is further moved in the X2-direction, the disc guides 11 move downward along the inclined portions of the guide slots 6a to reach the lower position. In the downward movement, the third disc D3 is supported by the lower ribs 11B and the second disc D2 is supported by the upper ribs 11A, and both the third disc D3 and the second disc D2 move downward in the Z2-direction. During the downward movement, the third disc D3 is placed on the turntable Ta. The second disc D2 is carried out of the disc apparatus 1 at the completion of the downward movement. In other words, the second disc D2, which is pressed to the X1 side by the pressure portion 14a of the pressure lever 14 that is moved by the clockwise rotation of the transfer roller R, is ejected by being clamped between the transfer roller R and the support base 13 moved in accordance with the rotation of the transfer device 5.

When the ejection of the second disc D2 is completed, the moving member 6 is further moved in the X2-direction, so that the clamp chassis 10 moves downward along the inclined portions of the guide slots 6b and 6c to reach the lower position. The clamper 10A chucks the turntable Ta, whereby the third disc D3 is clamped. The second disc D2, placed on the turntable Ta, is positioned between the lower end portions of the upper ribs 11A and the lower ribs 11B, and is not in contact therewith. When both of the clamp chassis 10 and the drive chassis 9 are located on the lower position in the disc apparatus 1, the disc recording and/or reproducing device provided on the drive chassis 9 is actuated, so that recording operation and/or reproducing operation of information on or from the third disc D3 is performed.

According to the disc apparatus of the present invention, recording and/or reproducing of information on and from a disc can be performed at two positions: one position where the clamp chassis 10 and the drive chassis 9 are located at the upper position, and the other position where the clamp chassis 10 and the drive chassis 9 are located at the lower position. For example, if the second disc D2 is inserted when the clamp chassis 10 and the drive chassis 9 are located at the upper position, the first and the second discs D1 and D2 are exchanged in the course of the movement of the clamp chassis 10 and the drive chassis 9 to the lower position to perform recording and/or reproducing of information on or from the second disc D2. Conversely, if the second disc D2 is inserted when the clamp chassis 10 and the drive chassis 9 are located on the lower position, the first and the second discs D1 and D2 are exchanged in the course of the movement of the clamp chassis 10 and the drive chassis 9 to the upper position to perform recording and/or reproducing of information on or from the second disc.

In addition, it is possible to insert the second disc D2 into the disc apparatus with the information recorded and/or reproduced on or from the first disc D1. Therefore, the first and the second discs can be smoothly exchanged since the following troublesome procedures of the conventional disc apparatus are not required: the first disc D1 of which information is recorded thereon and/or reproduced therefrom is once ejected; the ejected first disc D1 is removed; and then the second disc D2 is inserted.

In addition, although the heights of the upper position and the lower position depend on the heights of the guide slots provided in the moving member, one guide slot has only one inclined portion, so that a slim disc apparatus can be obtained.

Furthermore, since the ejected disc is clamped near the insertion opening, dropping of the disc can be prevented. In other words, it is always possible to remove the elected second disc. When the disc apparatus of the present invention is mounted in a vehicle, the disc can be left in place and then removed when the vehicle stops. Therefore, a disc apparatus with improved operational safety can be obtained.

In the above embodiment, the first disc D1 was already present in the disc apparatus 1 at either the upper position or the lower position. It is, however, appreciated that the second disc D2 can be loaded in the disc apparatus 1 only by inserting the second disc D2 into the insertion opening 3a when the first disc D1 is not present in the disc apparatus According to the present invention, another disc can be exchanged with a disc loaded in the disc apparatus by only inserting another disc via the insertion opening. Therefore, the discs can be smoothly exchanged.

What is claimed is:

1. A disc apparatus, comprising:

a casing;

a single insertion opening provided in said casing through which a disc is inserted into or ejected from said casing;

a transfer member for transferring a second disc inserted through said insertion opening into said casing and for ejecting a first disc located in said casing out through said insertion opening;

a turntable provided in said casing for rotationally driving said disc;

a clamper for engaging said disc with said turntable;

a pair of disc guides provided in said casing for supporting said first and second discs, said pair of disc guides being provided opposed to each other on both sides of an area above said turntable to which said disc is transferred, each of said disc guides having an upper rib and a lower rib extending in the direction of transfer and ejection of said disc; and a moving member for moving said pair of disc guides and said turntable in a direction perpendicular to the direction in which said first disc or said second disc is transferred by said transfer member, wherein said pair of disc guides are disposed so that one of said upper and lower ribs faces said insertion opening with said first disc supported by the other rib when said second disc is inserted;

wherein said second disc to be inserted is transferred by said transfer member from said insertion opening and supported by one of said upper and lower ribs;

wherein said pair of disc guides supporting said first and second discs are moved by said moving member so that said other rib supporting said first disc faces said insertion opening, and said first disc is ejected by said transfer member from said insertion opening;

wherein after the ejection of said first disc, said turntable is moved by said moving member to the position of said second disc, and is driven in association with said clamper while holding said second disc;

wherein said moving member moves along the direction of transfer and ejection of said disc so as to provide a space for moving said disc guides and said turntable, and said disc guides and said turntable are moved, respectively, following the movement of said moving member; and wherein said moving member comprises a pair of first guide slots that are engaged by pins on said disc guides and a pair of second guide slots that are engaged by pins on a chassis supporting said turntable, wherein said perpendicular movement of said disc guides and said turntable is caused by a sliding of the pins along the first and second guide slots during movement of the moving member.

2. A disc apparatus according to claim 1, wherein said transfer member includes a transfer roller, and a pressure means for pressing said second disc toward said transfer roller is provided in said casing.

3. A disc apparatus according to claim 1, wherein said apparatus further comprises a gear attached to said casing, said gear having a cam slot that is engaged by a pin on said moving member, wherein the movement of said moving member along the direction of transfer and ejection of the disc is accomplished by a rotation of the gear so as to cause the pin to slide along the cam slot.

4. A disc apparatus according to claim 1, wherein, when said second disc is inserted through said insertion opening, said clamper is separated from said turntable above said disc guides so as to provide a space for inserting said second disc into said casing.

5. A disc apparatus according to claim 4, wherein said moving member comprises a pair of guide slots that are engaged by pins on a chassis supporting said clamper, said pair of guide slots being opposed to each other on both sides of the moving member, wherein said clamper is separated from said turntable by a sliding of the pins along the guide slots during movement of the moving member.

* * * * *

UNITED STATES PATENT AND TRADEMARK OFFICE
CERTIFICATE OF CORRECTION

PATENT NO.    : 6,345,030 B1
DATED         : February 5, 2002
INVENTOR(S)   : Toshihiro Sakurai et al.

It is certified that error appears in the above-identified patent and that said Letters Patent is hereby corrected as shown below:

<u>Title page,</u>
Item [56], References Cited, U.S. PATENT DOCUMENTS, delete "5,896,981" and substitute -- 5,986,981 -- in its place.

Signed and Sealed this

Eighth Day of October, 2002

*Attest:*

JAMES E. ROGAN
*Attesting Officer*      *Director of the United States Patent and Trademark Office*